United States Patent Office 2,978,583
Patented Apr. 4, 1961

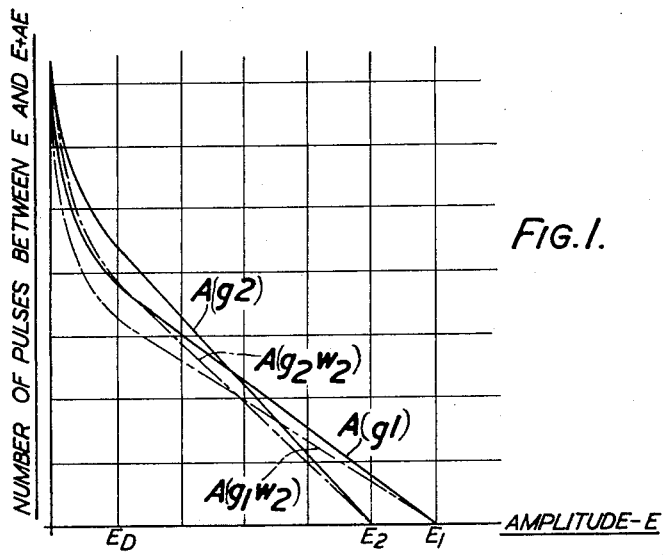
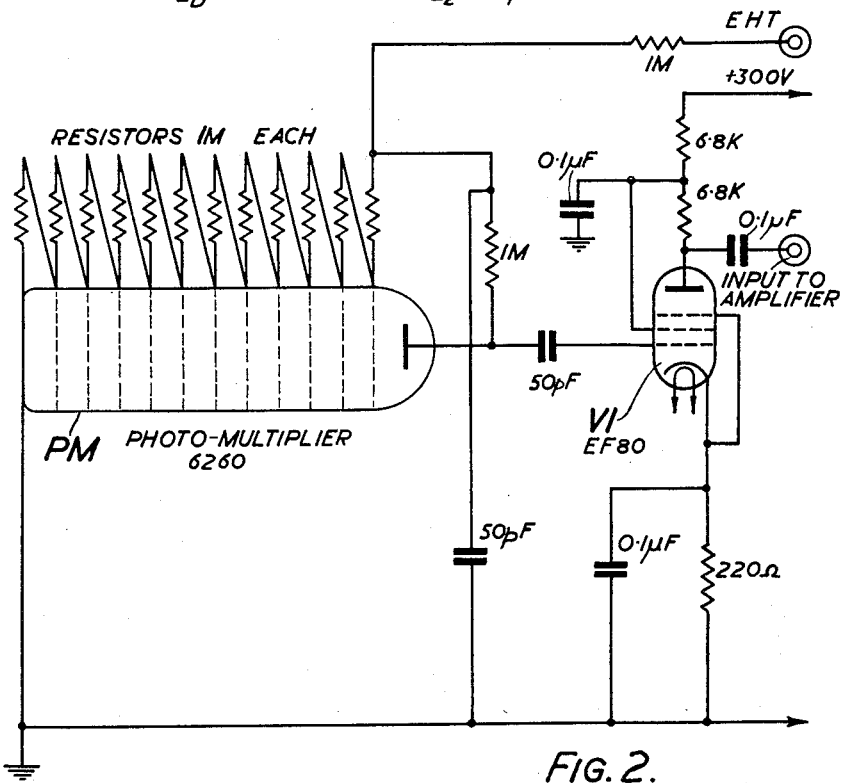
FIG. 1.
FIG. 2.
Kenneth Fearnside

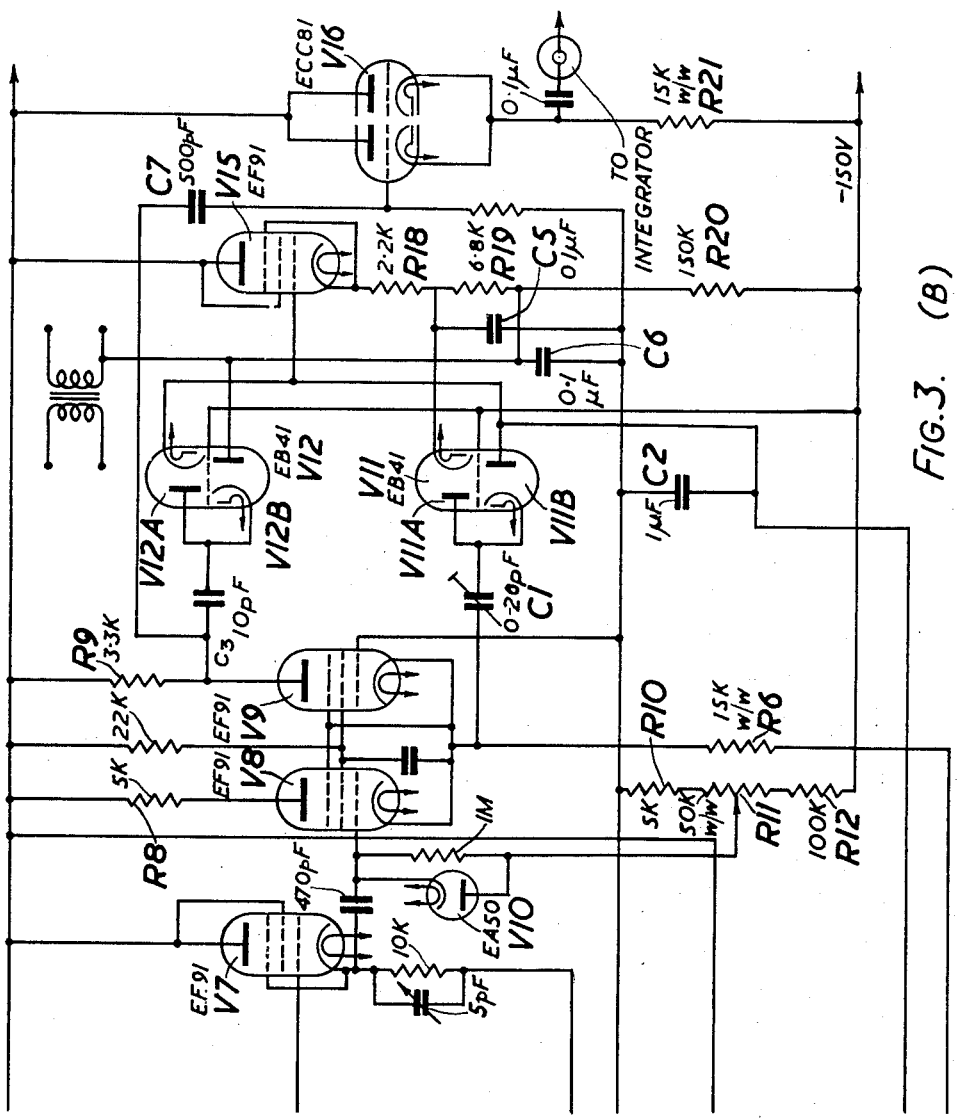

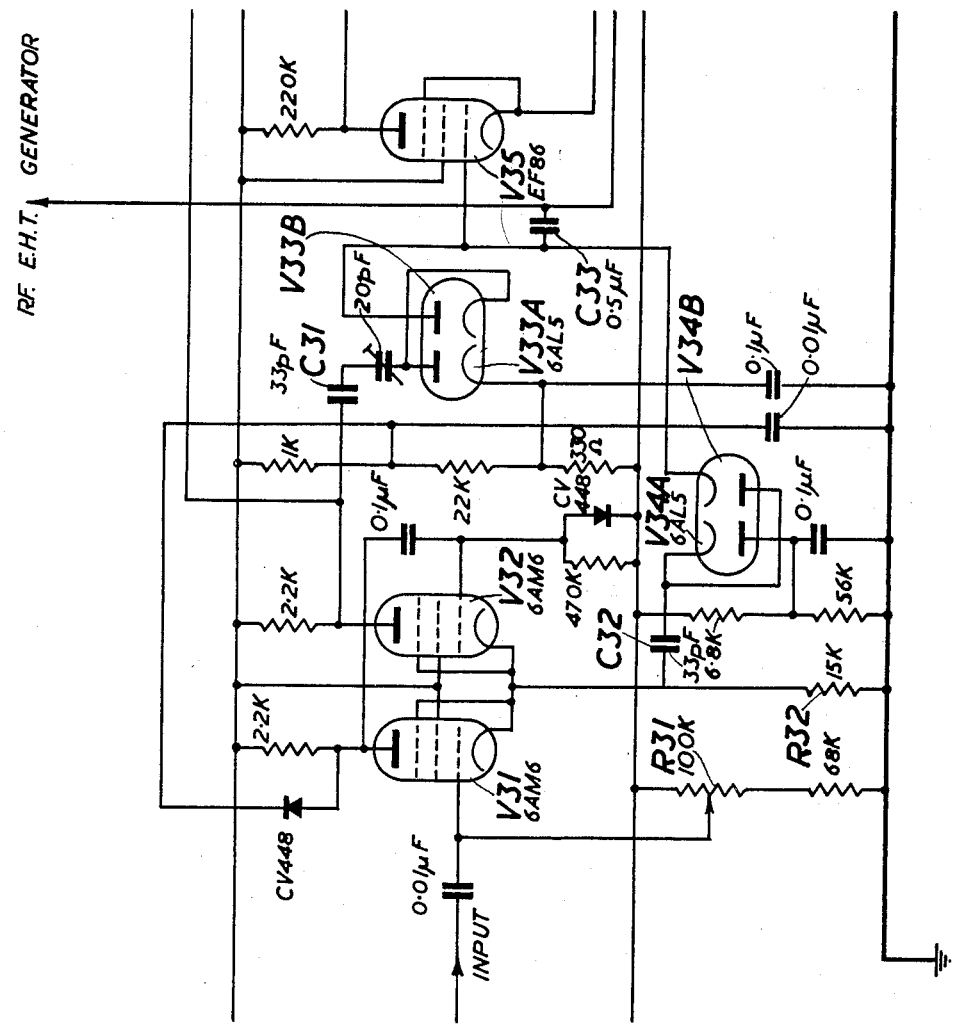

2,978,583

AMPLIFYING SYSTEMS

Kenneth Fearnside, Caversham, near Reading, England, assignor, by mesne assignments, to American Machine & Foundry Company, New York, N.Y., a corporation of New Jersey Filed Feb. 8, 1957, Ser. No. 639,083

3 Claims. (Cl. 250—71.5)

This invention relates to apparatus for measuring variations in a given parameter of radioactive radiation and is particularly concerned with the stabilization of such apparatus. Any parameter uniquely associated with the spectrum of beta or gamma radiation which results from the passage of radiation through some object to be measured can be used as a measure of the thickness, weight per unit area, or density of the object being investigated. In an arrangement described in my prior U.S. application Ser. No. 392,427 filed Nov. 16, 1953, for example, this parameter was the number of pulses per second having an amplitude greater than a predetermined value.

In that specification, it is pointed out that detectors or amplifiers used for this purpose may have incidental variation of sensitivity or gain which in some cases is of the order of, and may be greater than, the significant variation of the intensity of the radiation under observation. It is obviously impossible to use a system to determine significant variations which are less than the variation due to incidental variations of the system. To overcome this there is described in the earlier specification a system of stabilizing the gain of a system including an amplifier. In that system, the gain of a scintillation counter amplifier is controlled by means of the use of a distinct group of radiations which acts as a monitor; a group of alpha particles is used to maintain the sensitivity constant while a varying number of beta particles received is measured, the amplification being controlled in accordance with the number of alpha pulses per second having an amplitude greater than a preset value.

The present invention is concerned with a solution of this same problem, but in this invention the gain of the amplifier and/or the sensitivity of the detector is controlled in accordance with a different parameter not of monitor radiation specially provided for the purpose but of the radiation which is itself under observation. For this purpose there can be used any parameter which does not vary with the property of the absorber over the range concerned.

One such parameter which can be used for the purpose of the invention is the average amplitude of the pulses. This average is one which in the theoretical case is not affected by the absorption of the radiation by the material under observation but is affected by the gain of the amplifier used to amplify the pulses. In the practical case there is a small dependence of this ratio upon the absorption, but it is of a low order, and by controlling the amplifier gain in accordance with this average the constancy of sensitivity is increased.

Other objects and advantages of my invention will become more apparent when considered in view of the following specification and accompanying drawings, in which:

Fig. 1 is a graphical representation of the differential bias curve of the pulses derived from a radiation wherein the number of pulses lying within the amplitudes E and $E+\Delta E$ are plotted against the amplitude E of the pulses;

Fig. 2 is a partly simplified circuit diagram of the detector head amplifier;

Figs. 3(A) and 3(B) constitute a circuit diagram of the main amplifier and discriminator; and Figs. 4(A) and (B) constitute a circuit diagram of a circuit providing a voltage suitable for the control of an E.H.T. generator energizing the photo-multiplier tube of Fig. 2.

In Figure 1 the abscissa represents the amplitude E of the pulses, while the ordinate is the number of pulses lying within the amplitudes of E and $E+\Delta E$.

In Figure 1, curve A $(g1)$ is a curve which might be obtained from an idealized type of radiation. Over the major part the curve is straight; the nonlinearity at the lower values of E is due to random noise and so on. Usually, an amplitude filter, or discriminator, set at amplitude $E_D$ is used to eliminate the effect of noise pulses. Curve A $(g1)$ strikes the axis at amplitude $E_1$, which is therefore the maximum amplitude of the pulses arriving at the discriminator stage.

If now there is a change of sensitivity of the detector system, there will be a change of amplitude of the pulses. Suppose there is a small decrease of gain from a value of $g1$ to $g2$ and that the maximum amplitude, formerly represented by $E_1$, is now $E_2$. This change of gain does not, however, change the total number of pulses, but only their amplitude and so the new bias curve A $(g2)$ will enclose the same area beneath it as curve A $(g1)$, so far as the pulses representing the radiation are concerned; that is to say, if the straight parts of curves A $(g1)$ and A $(g2)$ were extended back to zero the areas of the two triangles thus presented would be equal.

If with the sensitivity at $g1$ an absorption or increase of absorption of the radiation occurred, it would not affect the maximum amplitude $E_1$, but would decrease the number of pulses, and the curve might then be as shown at A $(g_1W_2)$. It will be seen that the area of the triangle beneath curve A $(g_1W_2)$ is less than that below curve A $(g_1)$. Similarly, with reduced gain $g_2$ and increased absorption curve A $(g_2)$ is depressed to curve A $(g_2W_2)$.

The effect of change of sensitivity is thus distinguishable from the effect of a change of absorption in that the former produces a lateral displacement of the center of symmetry of the area under the curve while the latter does not. This parameter can therefore be used for the purpose of the invention.

Figure 3:
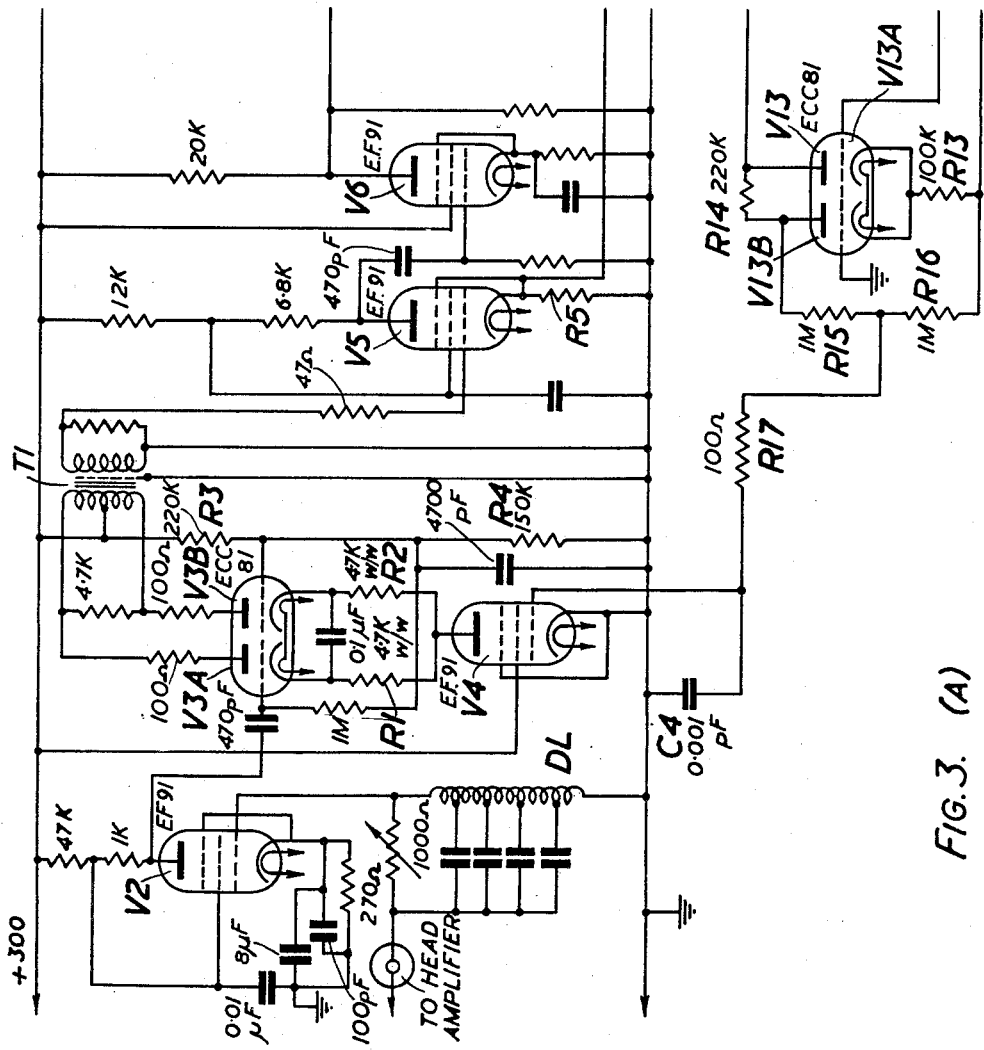

Reference will now be made to Figs. 2 and 3 which illustrate a system using this parameter to control the sensitivity of the apparatus.

In the system described the amplified beta spectrum is applied to a stage which produces two pulses from each pulse applied to it. One of the two pulses is of one polarity and is of constant amplitude, and is used to vary in one sense the charge on a capacitor. The other pulse is of the opposite polarity and is of an amplitude proportional to the amplitude of the applied pulse above the discriminator level; this pulse is used to vary in the opposite sense the charge on the same capacitor. The voltage thus appearing on the capacitor is then used to control the gain of the amplifier.

The circuit is so arranged that a pulse equal to the mean pulse height at the controlled value of the amplification of the beta spectrum causes no change in the voltage across the capacitor; consequently beta pulses greater than the mean height causes the amplification of the system to decrease and beta pulses of height smaller than this mean value will increase the amplification with an effect in each case proportional to the deviation of the pulse from the means. This arrangement gives continuous control of sensitivity and ensures the minimum statistical fluctuation about the mean value.

Turning now to the circuit of Figure 2 the tube PM is a photo-multiplier tube which, in conjunction with a suitable scintillation device, forms the detector for the beta radiation under examination. Associated with the photo-multiplier is a head amplifier tube $V_1$; this head amplifier unit is conveniently arranged remotely of the main amplifier unit.

The input to the main amplifier shown in Figure 3 includes a delay line DL which shapes the pulses into a constant rectangular form of about 1 microsecond duration. These pulses are fed through a first amplifier tube $V_2$ to the input of a gain control stage including a double triode tube $V_3$ and a pentode tube $V_4$. The cathode currents of the two triode sections $V_3A$ and $V_3B$ of tube $V_3$ pass respectively through resistors $R_1$ and $R_2$, and then through tube $V_4$. The anodes of the two sections are connected to the ends of the primary winding of transformer $T_1$, the centre-tap of which is connected to the anode supply.

The input pulses are applied to the control grid of triode section $V_3A$, while the control grids of both sections are returned to a point on a potential divider formed by resistors $R_3$ and $R_4$. The tube $V_4$ presents a common cathode load impedance for the two sections, so that each input pulse produces a pulse at the anode of section $V_3A$ and also a pulse of opposite polarity at the anode of section $V_3B$. The tube $V_4$ will in addition control the direct voltage impressed between anodes and cathodes of tube $V_3$; by varying the control grid potential of tube $V_4$, and hence the resistance which it presents, the gain of the stage including the tube $V_3$ can be varied. By this means it is possible to achieve a control of gain which depends linearly upon the value of a control voltage applied to tube $V_4$ over a range of several volts.

Pulses from the output of tube $V_3$ are applied to the input of tube $V_5$ which with tubes $V_6$ and $V_7$ forms a straightforward voltage amplifier with negative feed-back, tube $V_7$ being a cathode follower, the negative feed-back is obtained by means of the resistor $R_5$ common to the input and output circuits. The output from the cathode of tube $V_7$ is applied to the control grid of a pair of tubes $V_8$, $V_9$ with a D.C. restorer tube $V_{10}$. The valves $V_8$, $V_9$ have a common cathode coupling resistor $R_6$. The tubes $V_8$ have anode load resistors $R_8$, $R_9$ respectively. The grid of tube $V_8$ is returned to a point of negative potential on a potential divider composed of resistors $R_{10}$, $R_{11}$ and $R_{12}$ across a negative supply $-150$ v. The control grid of tube $V_9$ is returned to ground.

Normally the tube $V_9$ is passing current and tube $V_8$ is cut off. When a pulse is received the ampulitude of which exceeds a value determined by the setting of resistor $R_{11}$, a pulse appears at the cathode of this tube. This pulse increases the potential of the grid of section $V_9$, reducing its node current.

The output pulse, obtained from the cathodes of tubes $V_8$ and $V_9$ is of an amplitude proportional to the amplitude above the discriminator level of the input pulse applied to tube $V_8$, and this output pulse is fed, through the variable capacitor $C_1$ and the diode pump formed by the two diodes $V_{11}A$ and $V_{11}B$ of a double diode tube $V_{11}$, to charge a capacitor $C_2$. At the same time as the pulse appears at the cathodes of tubes $V_8$, $V_9$ a pulse of amplitude independent of the amplitude applied to the input of tube $V_8$ appears at the anode of tube $V_9$. This last pulse is fed through capacitor $C_3$ and the diode pump formed by the two diode sections $V_{12}A$ and $V_{12}B$ of a double diode tube $V_{12}$, also to the capacitor. It will be seen, however, that the pulses fed to capacitor $C_2$ are of opposite polarity.

The voltage on capacitor $C_2$ is used to control the bias on the grid of tube $V_4$ to control the gain of the amplifier as described above.

The voltage which appears on capacitor $C_2$ is applied to a buffer and amplifier stage including a double diode tube $V_{13}$; the voltage is applied to the control grid of the first section $V_{13}A$ of this tube, which is operated as a cathode follower, and which is coupled to the second section $V_{13}B$ by the common cathode resistor $R_{13}$. The second section $V_{13}B$ of the valve has an anode load $R_{14}$, and a proportion of the amplified direct voltage which appears at the anode of the valve is derived by a potential divider consisting of resistors $R_{15}$ and $R_{16}$, and is applied through a filter including resistor $R_{17}$ and capacitor $C_4$ to the control grid of tube $V_4$.

The voltage which appears on capacitor $C_2$ is also applied to the control grid of a cathode follower tube $V_{15}$, having cathode resistors $R_{18}$, $R_{19}$, $R_{20}$. The voltage developed at the junction of resistors $R_{18}$, $R_{19}$, smoothed by capacitor $C_5$, is applied to the cathode of diode $V_{11}A$; will then be developed across the cathode resistor $R_{21}$ smoothed by capacitor $C_6$, is likewise applied to the anode of diode $V_{12}B$. By this means it is arranged that the charge imparted to capacitor $C_2$ is independent of the potential to which that capacitor is charged.

The constant amplitude pulses which appear at the anode of tube $V_9$ are fed through capacitor $C_7$ to a cathode follower output stage, comprising the two parallel-connected sections of a double triode tube $V_{16}$. There will then be developed across the cathode resistor $R_{21}$ of this stage pulses of constant height and rate equal of the rate of the original beta pulses, which can be fed to a conventional rate-meter or other measuring device.

Figure 4:
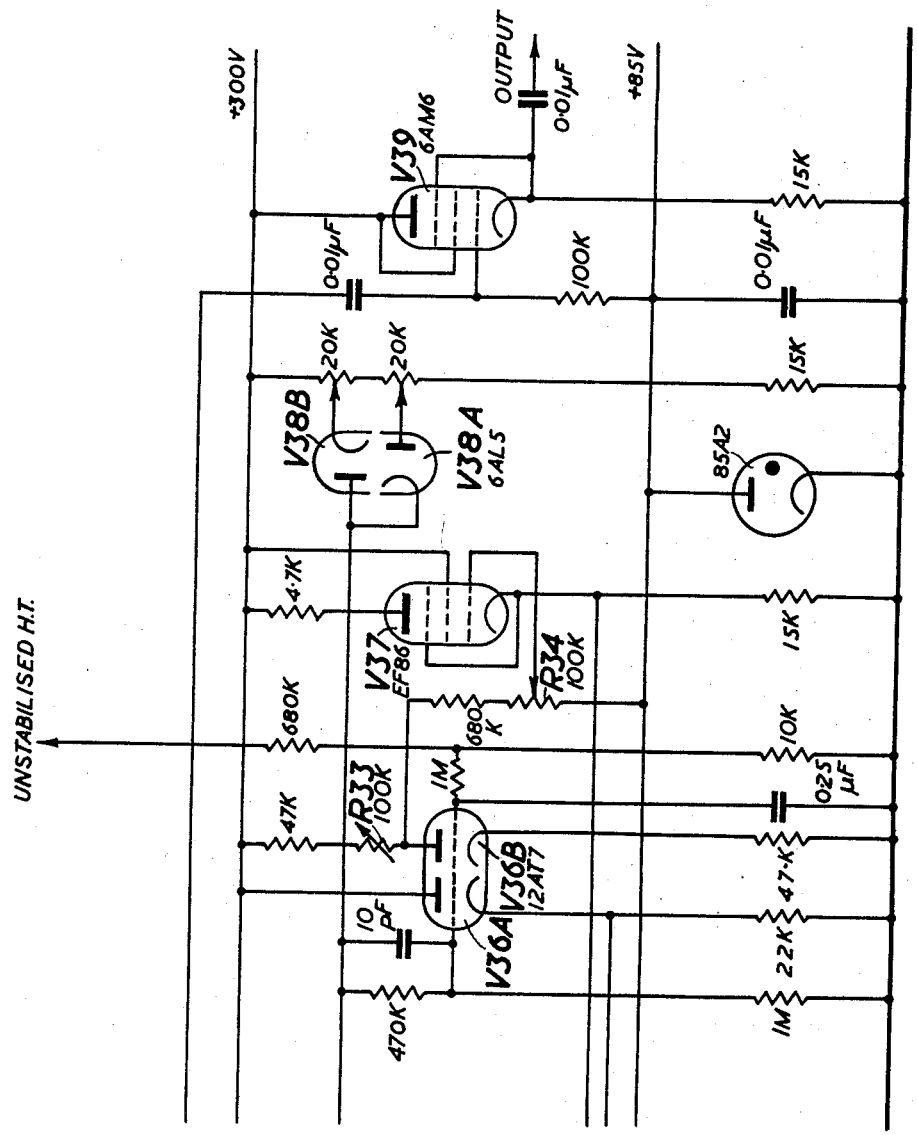

As an alternative, or in addition to controlling the gain of an amplifier stage to effect the desired stabilization of the system, it is possible also to vary a voltage applied to the detecting device, with the object of changing its sensitivity in the same way. In the case of a photo-multiplier such as that described, it is possible to vary the energizing voltage applied to the tube. In Figure 4 there is shown a circuit which provides a voltage suitable for the control of an E.H.T. generator used to energize the photo-multiplier.

Referring to this drawing, tubes $V_{31}$ and $V_{32}$ form a discriminator similar to that provided by tubes $V_8$ and $V_9$ of Figure 3. Pulses from the detector are fed to the grid of tube $V_{31}$, pulses below a certain amplitude being rejected in accordance with the setting of variable resistor $R_{31}$. Tubes $V_{31}$ and $V_{32}$ have a common cathode resistor $R_{32}$ across which an output pulse appears of amplitude proportional to the amplitude above the discriminator level of the input pulse. At the same time a pulse of amplitude independent of the amplitude of the input pulse appears at the anode of $V_{32}$. This pulse is fed via capacitor $C_{31}$ and the diode pump formed by diodes $V_{33}A$ and $V_{33}B$ to an integration circuit; the pulse from the cathodes of $V_{31}$ and $V_{32}$ is fed to the same circuit through capacitor $C_{32}$ and the diode pump formed by diodes $V_{34}A$ and $V_{34}B$.

The integration circuit comprises tubes $V_{35}$ and $V_{36}A$ providing a Miller circuit of long time constant. Feed-back from the anode to grid of tube $V_{35}$ is taken through $V_{36}A$ connected as a cathode follower so as to bring the voltage across the tank capacitor $C_{33}$ to a mean level of zero volts. This arrangement minimizes D.C. leakage which would affect the stable position of the grid of valve $V_{35}$.

The voltage on the cathode of tube $V_{36}A$ is fed to the screen grid of a tube (not shown) operating as a conventional R.F.E.H.T. generator and supplying the energizing voltage to the photomultiplier. The E.H.T. delivered by such a generator for a small current load is a direct function of the screen grid potential and can be smoothly varied by varying the voltage applied to the screen grid.

The cathode potential of $V_{35}$ is set by the current through the tube $V_{37}$ and the latter is partially controlled by the mean value of the mains supply to the amplifier. This enables the tube heaters to be fed from an unstabilized supply. Changes in the heater voltage cause small changes in the equilibrium value of the E.H.T., but these changes can be compensated by arranging that the cathode potential of $V_{35}$ changes in a suitable manner. Unstabilised H.T. is smoothed by valve $V_{36}B$ and serves to apply a voltage in opposite phase to the grid of tube $V_{37}$, which voltage is adjustable by means of variable resistors $R_{33}$ and $R_{34}$.

The limits of the voltage range of the cathode of $V_{36}A$, and hence of the controlling voltage to the E.H.T. generator, are defined by the diodes $V_{38}A$ and $V_{38}B$ which limit the range of the anode potential of $V_{35}$. The lower limit ensures the initial application of a voltage to the photomultiplier to produce pulses while the upper limit ensures that on switching on, the amplifier does not limit and block so as to increase the E.H.T. still further.

There is a high gain from the grid potential of valve $V_{35}$ to the E.H.T. voltage and a further high gain relation between the latter voltage and the photomultiplier gain. Consequently the range of variation of the grid potential of $V_{35}$ is small in comparison with the size of the pulses fed through the diode pump.

Output pulses to a ratemeter are taken from the anode of valve $V_{32}$ through valve $V_{39}$ acting as a cathode follower.

In the description of the circuit diagrams, many of the component elements such as resistors and capacitors have not been specifically mentioned, but the values of these components and the specific valve types used are given in the drawings. With this information the detailed operation of the circuits will be apparent to those skilled in the art.

What is claimed is:

1. In an apparatus for measuring the radiation of a radioactive source and including a detector of the scintillation type for emitting light in response to the radiation and a photomultiplier arranged so that the light falls on its photoelectrode, the sensitivity of said photomultiplier being controlled by means supplying the energizing voltage applied thereto; an amplifier connected to said detector, said amplifier having a discriminator stage producing for each detector output pulse a first pulse of amplitude independent of the amplitude of the detector output voltage pulse and a second pulse having an amplitude proportional to the amplitude of the detector output pulse above the level of the discriminator stage, an integrating stage for producing a sensitivity control pulse as a function of the difference of the first and second discriminator pulses, and an output stage connected to said discriminator stage for producing an output voltage pulse as a function of said discriminator stage first pulse, and means for applying the sensitivity control pulse from the amplifier integrating stage to the photomultiplier energizing means for adjusting the sensitivity of the detector.

2. In an apparatus for measuring the absorption of radiation by an object positioned intermediate a source of radioactive energy and a detector, said detector producing an output voltage pulse which is a function of the radiation applied thereto, said apparatus including an amplifier having an input connected to said detector; the improvement wherein said amplifier has a gain control stage, and means responsive solely to parameters of the radiation of said radioactive source for controlling the sensitivity of said amplifier comprising a discriminator having an input connected to said amplifier and producing for each detector output pulse a first pulse which is dependent on the radiation absorbed by the object and independent of the amplitude of the detector output pulse and a second pulse independent of the radiation absorbed by the object and proportional to the amplitude of the detector output pulse above the level of the discriminator, an integrator for producing a gain control voltage as a function of the difference of said first and second discriminator stage pulses, an output stage having an input connected to the discriminator for producing an output voltage pulse as a function of said discriminator first pulse, and means applying said gain control voltage upon said amplifier gain control stage to control the sensitivity of the apparatus.

3. Apparatus as defined in claim 2 wherein the radioactive source produces beta radiation and wherein the output voltage pulses from said amplifier output stage are of constant amplitude and of a rate equal to the rate of the original beta radiation.

References Cited in the file of this patent

UNITED STATES PATENTS

| | | |
|---|---|---|
| 2,783,387 | Howell | Feb. 26, 1957 |
| 2,790,945 | Chope | Apr. 30, 1957 |
| 2,829,268 | Chope | Apr. 1, 1958 |
| 2,831,980 | Howell | Apr. 22, 1958 |

OTHER REFERENCES

Electronics, October 1947, Beta-Ray Thickness Gage, pages 106 to 112.